United States Patent
Stetson et al.

(10) Patent No.: US 9,560,178 B1
(45) Date of Patent: Jan. 31, 2017

(54) SUPPORT HOUSING FOR MODULAR ELECTRONIC DEVICES

(71) Applicant: GOOGLE INC., Mountain View, CA (US)

(72) Inventors: Philip Sean Stetson, Wexford, PA (US); Roman Lewkow, San Jose, CA (US); Kevin D. Brune, Maple Valley, WA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/724,265

(22) Filed: May 28, 2015

(51) Int. Cl.
*H04M 1/02* (2006.01)

(52) U.S. Cl.
CPC .................. *H04M 1/0202* (2013.01)

(58) Field of Classification Search
CPC ............ H04M 2250/22; H04M 1/0202; H04M 1/0264
USPC ......... 455/575.1, 556.1, 557, 558, 572, 566; 379/446.455; 439/37
See application file for complete search history.

(56) References Cited

U.S. PATENT DOCUMENTS

| | | |
|---|---|---|
| 6,480,724 B1 | 11/2002 | Erkkila et al. |
| 7,515,709 B2 | 4/2009 | Richter |
| 7,618,260 B2 | 11/2009 | Daniel et al. |
| 8,086,269 B2 | 12/2011 | Wang |
| 8,380,252 B2 | 2/2013 | Ijas et al. |
| 8,483,758 B2 | 7/2013 | Huang |
| 2002/0102946 A1 | 8/2002 | SanGiovanni |
| 2002/0155864 A1 | 10/2002 | Wang |
| 2010/0245234 A1* | 9/2010 | Park ...................... G06F 1/1626 345/156 |
| 2010/0279739 A1* | 11/2010 | Lin ........................ G06F 1/1616 455/566 |
| 2013/0057785 A1* | 3/2013 | Hiratomo ............ H04M 1/0202 348/843 |
| 2013/0172045 A1* | 7/2013 | Caballero ............ H04B 1/3838 455/552.1 |
| 2014/0253799 A1* | 9/2014 | Moon ................. H04M 1/0264 348/376 |
| 2014/0362280 A1* | 12/2014 | Tada ........................ G02B 7/04 348/357 |
| 2015/0323456 A1* | 11/2015 | Agashe ............... B81C 1/00341 356/445 |

(Continued)

OTHER PUBLICATIONS pocket-lint.com., "Fonkraft: Modular smartphone with 4,100mAh battery, 20MP camera, 192kHz audio and more is here," (Apr. 28, 2015). Retrieved from the Internet on Jun. 2, 2015: http://www.pocket-lint.com/news/133703-fonkraft-modular-smartphone-with-4-100mah-battery-20mp-camera-192khz-audio-and-more-is-here.

(Continued)

*Primary Examiner* — Inder Mehra
(74) *Attorney, Agent, or Firm* — Marshall, Gerstein & Borun LLP (57) ABSTRACT

Embodiments are provided for a support housing for an electronic device configured to removably secure a set of hardware modules. According to certain aspects, the support housing may be defined by a set of front slots, a set of rear slots, and a center plate. The support housing may include an opening that extends through the center plate from one of the front slots to one of the rear slots. When a front module is secured to the front slot and a rear module is secured to the rear slot, the opening in the center plate enables the front module to physically interface with the rear module.

18 Claims, 8 Drawing Sheets

(56) References Cited

U.S. PATENT DOCUMENTS

2016/0173673 A1* 6/2016 Hyun .................... H04M 1/236
455/566

OTHER PUBLICATIONS phonebloks.com., "Phonebloks a Phone Worth Keeping," (2015). Retrieved from the Internet on Jun. 2, 2015: https://phonebloks.com/en.

cnet.com., "Samsung Upstage review," (Mar. 25, 2007). Retrieved from the Internet on Jun. 2, 2015: http://www.cnet.com/products/samsung-upstage/.

Google Inc., "Project Ara Module Developers Kit (MDK)," (2014). Retrieved from the Internet at: URL:http://www.industrie.com/it/mediatheque/3/1/6/000012613.pdf>.

* cited by examiner

SUPPORT HOUSING FOR MODULAR ELECTRONIC DEVICES

FIELD

This application generally relates to electronic devices and functionalities thereof. In particular, this application relates to a support housing for an electronic device that enables improved device performance.

BACKGROUND

Portable electronic devices such as smart phones and tablet devices are becoming more ubiquitous as underlying technology and device capability improves. Generally, with improved technology comes more portable and advanced devices. These devices incorporate numerous components that support various device functions and applications. For example, current smart phones include components that support various types of wireless communication, image and video capture, audio and video playback, data storage, and/or the like.

To maintain portability, electronic devices have dimensions that are generally constrained to be smaller. As a result, the sizes of the device components are also constrained, which impacts device and component performance. For example, smart phone cameras are limited in the size of image sensors and the physical size of lenses, which negatively affects image quality and general camera versatility. For further example, smart phone speakers are limited by the thickness of the smart phone, which negatively affects audio quality and volume, among other drawbacks. While some electronic devices contemplate incorporating modular components, these modular components are bulky and unwieldy such that some of the modular components protrude beyond the dimensions of a base support housing, which is generally not desirable in consumer devices.

There is therefore an opportunity for electronic devices that support modular components and that include a support housing designed to enable improved device performance.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Existing portable electronic devices such as smart phones and tablet devices are often equipped with built-in components configured to support various device functionalities. For example, a smart phone typically includes an imaging module that enables digital image capture as well as a speaker that enables audio output. A user of the electronic device may control operation of these built-in components via a user interface, such as a touchscreen and a set of hardware and/or software buttons. However, consumer expectations with respect to the thickness (and other dimensions) of electronic devices have resulted in current electronic devices with increasingly limited thickness. For example, current smart phones typically measure less than 10 mm thick, and in some cases may be as small as 7 mm or less.

These physical constraints limit the configuration of the components, which impacts the performance of the components. For example, the size of the image sensor and the focal length of the lens are limited by the thickness dimension of the electronic device. For further example, the size of a speaker or transducer and the corresponding "back volume" are also limited by the thickness dimension of the electronic device. Some electronic devices support hardware modules securing thereto (e.g., a modular lens). However, these hardware modules, in order to improve associated performance, protrude from the defined dimensions of the electronic devices, which may be undesirable to consumers.

The embodiments described herein provide for an electronic device with a support housing that enables modular hardware components to utilize an entire thickness of the electronic device, in contrast to a thickness of the modular hardware components themselves. According to certain aspects, the support housing includes a set of front slots and a set of rear slots to which hardware modules may secure, as well as a center plate disposed between the set of front slots and the set of rear slots. The center plate incorporates an opening that extends therethrough from a front slot to a rear slot. The opening may therefore enable a front hardware module secured to the front slot to physically interface with a rear hardware module secured to the rear slot. Therefore, the front hardware module and the rear hardware module may, in operation, utilize a combined thickness of the hardware modules and the center plate.

The embodiments as discussed herein offer benefits to users of the electronic devices. In particular, by utilizing an entire thickness of an electronic device, a set of oppositely-positioned hardware modules supports improved component operation and performance. The electronic devices further offer flexibility in design possibilities for the hardware modules themselves, as the hardware modules may expand or extend into the opening of the center plate. It should be appreciated that other advantages and benefits are envisioned.

The systems and methods discussed herein therefore address a challenge that is particular to electronic devices. In particular, the challenge relates to components that are limited by the physical constraints of the electronic devices. This is particularly apparent as electronic devices become more advanced but increasingly portable. Instead of a modular electronic device that has defined layers and a center plate, the modular electronic device of the present embodiments includes a support housing with an opening through the center plate that enables oppositely-positioned hardware modules to physically interface. Accordingly, the systems and methods are necessarily rooted in computer technology in order to overcome the noted shortcomings that specifically arise in the realm of electronic devices.

Figure 1:
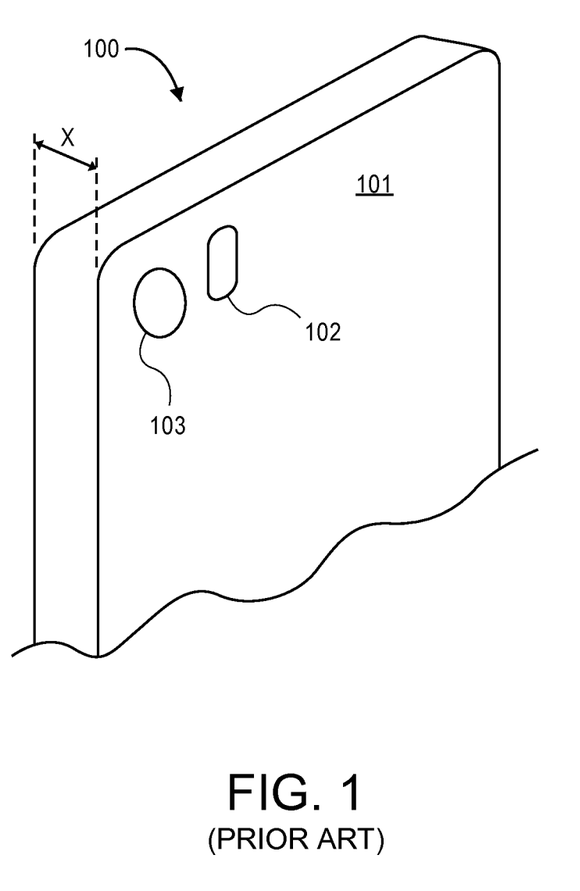
FIG. 1 depicts a conventional electronic device.

FIG. 1 depicts a conventional electronic device 100, such as a smart phone. The electronic device 100 may include a housing 101 that may contain many hardware and software components that support various functionalities and applications of the electronic device 100. In one particular example, the housing 101 contains an imaging module or camera that may utilize a lens 103 and flash component 102 during operation, along with other components such as a lens cover, a shutter, and an image sensor. The components of the imaging module, though, are constrained to the physical dimensions of the housing 101 as well as by other components contained within the housing 101.

As illustrated in FIG. 1, the electronic device is defined by a set of dimensions, including a thickness or height dimension "x". Accordingly, the imaging module (including the lens 103, the flash component 102, and any other components) are constrained to at least the height dimension "x" as well as by other components contained within the housing 101. For example, the electronic device 100 may include a display screen that is located opposite from the imaging module. In this regard, both the size of the image sensor and the focal length of the lens 103 are limited, among other impediments, which negatively affects performance of the imaging module. As another example, audio output components such as a speaker are limited in the amount of "back volume" for the speaker to push against and project sound from the speaker.

While various components such as the imaging module may be designed to protrude from the housing 101, this is an undesirable feature for users as it impacts portability and results in the electronic device 100 being bulky and unwieldy.

Figure 2A:
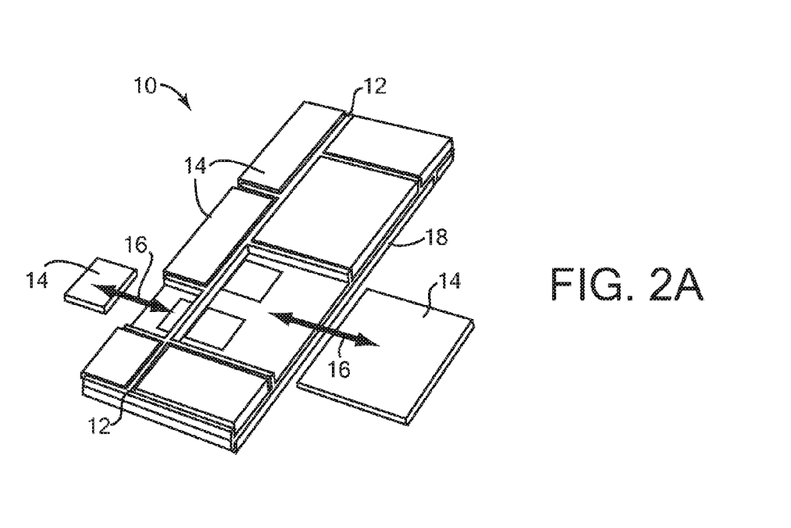
FIG. 2A depicts an example electronic device including hardware modules configured to connect thereto, in accordance with some embodiments.

FIG. 2A depicts an example electronic device 10 configured to removably secure a set of modules. The electronic device 10 may be any type of portable electronic device, for example, a notebook computer, a mobile phone, a Personal Digital Assistant (PDA), a smart phone, a tablet computer, a multimedia player, an MP3 or MP4 player, a digital or analog broadcast receiver, a remote controller, or any other electronic apparatus. The electronic device 10 may include various electronic and mechanical features and components capable of supporting a variety of functionalities and applications, including phone and video calls, data communication, general computing and processing data, audio input and output, graphical display, sensing environmental conditions, sensing interactions with users, recording data, generating notifications, maintaining scheduling data, and/or the like.

As illustrated in FIG. 2A, the electronic device 10 may include a support housing 12 that may be configured to removably secure a set of modules 14 thereto. In particular, a user may manually attach the set of modules 14 to or remove the set of modules 14 from the support housing 12. The set of modules 14 may be electrically and/or physically connected to the support housing 12 using any of a variety of connection components, such as magnetic connectors (e.g., electro-permanent magnets (EPMs)), capacitive connectors, optical connectors, or other electrical connections; physical male/female connectors or ports (e.g., ribs and recesses); and/or other fastening or connecting components.

Some implementations enable the set of modules 14 to be locked in place to the support housing 12 at a particular position within the support housing 12. For example, the set of modules 14 may be locked to the support housing 12 using a hardware locking mechanism such as a latch. According to embodiments, a power source (e.g., a battery) may be included in each of the set of modules 14 to power its own operation. The set of modules 14 may additionally or alternatively be powered by a power source provided in other modules 14 or located within the electronic device 10, such as a battery. In one implementation, the connection components may also supply power from a power source of the electronic device 10 to the set of modules 14.

The support housing 12 may include a set of ports, receptacles, or the like (generally, a set of ports) spaced at various positions or locations, where the set of ports may be physically separated by a set of ribs and/or a set of spines that may protrude from the support housing 12. The set of ports may be configured to receive and removably secure the set of modules 14 via corresponding connector components. For example, as illustrated in FIG. 1, some of the set of modules 14 may be slid in or out of some ports of the support housing 12 as shown by arrows 16. The set of ports may be located at various positions of the support housing 12, and may be different sizes and/or include different types and/or amounts of connector components. Similarly, the set of modules 14 may be of different sizes and shapes, and may include various types and amounts of connector components.

Accordingly, various of the set of modules 14 may be compatible with some of the ports and incompatible with others of the ports. Therefore, the user may interchange some of the modules 14 in various correspondingly-sized ports of the support housing 12 if those modules 14 are physically similar in dimensions and/or include the same type and/or amount of connector components. The interchangeability of the set of modules 14 enables the electronic device 10 to achieve different physical layouts.

According to embodiments, each of the set of modules 14 may include electronic components that enable or are associated with one or more functions. Specifically, these one or more functions may contribute to or supplement operation of the electronic device 10 when the corresponding module 14 is secured to the electronic device 10 via the support housing 12. In some implementations, some of the modules 14 may include components that are used by various functions or applications of the electronic device 10. For example, the module 14 may include a lens and image sensor that is used by a camera application supported by the electronic device 10; or a display screen module 18 may include a display screen that is used by a video playback application executable by the electronic device 10. In other implementations, some of the modules 14 may provide functionality that contributes to operation of the electronic device 10. For example, various of the modules 14 may add memory to the total memory of the electronic device 10, processing capability to the total processing capability of the electronic device 10, or battery power to an overall power capability of the electronic device 10.

It should be appreciated that a variety of functions and applications associated with the modules 14 are envisioned.

In one implementation, the modules 14 may be associated with communication capabilities of the electronic device 10. For example, one of the modules 14 may be a subscriber identity module (SIM) module that may include a socket (or other receptacle) to interface with a SIM card inserted in the socket, where the SIM card may store subscriber identity information for a phone carrier or other service carrier. Accordingly, different SIM cards may be inserted into or removed from the SIM module to enable different subscribers or accounts to use the electronic device 10, and/or to enable retrieval of stored personal data of a user, such as contacts and/or other data. The SIM module may also include a physical slider or switch to enable a user to select different subscriber services that may be linked to the SIM card. For example, different switch positions may correspond to different options to send/receive voice calls only (and not data), send/receive data only (such as via a data plan), or disallow phone service if roaming charges on the device would be incurred.

In some implementations, multiple of the set of modules 14 may be fastened or connected to each other via electrical and/or physical connectors. For example, magnetic connections or connectors may provide an attractive force between or among modules 14 to attach them securely to each other, but still enable a user to readily pull apart the modules 14; or physical connectors may provide physical engagement between or among some of the modules 14. Some implementations may enable wireless communication (e.g., short-range communication such as RF signals) between the modules 14 and the support housing 12, or between the modules 14 themselves. Some of the modules 14 may also be positioned in the ports of the support housing 12 so those modules 14 are adjacent to each other.

In one example implementation, the modules 14 may be display modules that each includes a display screen on its surface that may support graphical display output. The display screen on each module may extend to one or more edges of the module, and the module may include a connector to be linked directly to another module at a corresponding edge. Accordingly, each display module may be connected to another display module at corresponding edges to cause the display screens to be positioned adjacent to each other and to form a combined display screen having a larger area. A display controller of the electronic device 10 may manage the content that is displayed on the adjacent display modules such that the combined display area of the adjacent display modules acts as a single large screen, or as multiple screens defined arbitrarily within the combined display area. Some implementations enable a display screen area to be extended in horizontal and/or vertical directions of the display modules.

According to embodiments, the electronic device 10 may be physically implemented according to various configurations and may support multiple ways for the modules 14 to connect to the support housing 12. In particular, the electronic device 10 may include one or more layers, where each layer may define a plane of the support housing 12 and that may removably secure multiple of the modules 14. In some implementations in which the electronic device 10 includes multiple layers, each layer may be aligned parallel to the other layers.

Figure 2B:
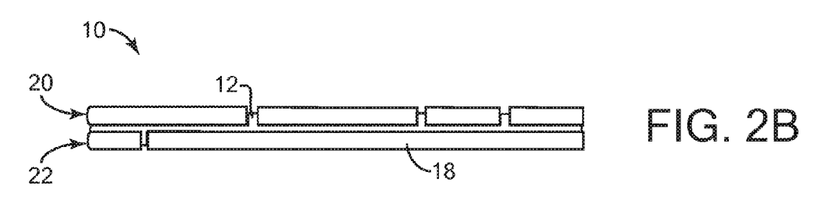
FIG. 2B depicts a side view of an example electronic device, in accordance with some embodiments.

FIG. 2B depicts a side view of the electronic device 10 described with respect to FIG. 2A. The electronic device 10 depicted in FIG. 2B includes two layers: a rear or back layer 20 (which is shown facing up in FIG. 2A) and a front layer 22 (which is shown facing down in FIG. 2A). The rear layer 20 may removably secure a first set of modules that may be arranged within a plane and the front layer 22 may removably secure a second set of modules that may be arranged within another plane, where the rear layer 20 and the front layer 22 may be aligned parallel to each other.

The support housing 12 may accordingly include a first side associated with the rear layer 20 and a second side associated with the front layer 22, where the first side and the second side may include ports having the same or different amount, type, and size to respectively removably secure the first set of modules and the second set of modules. For example, the front layer 22 may face the user during normal use of the electronic device 10 and may accordingly include a larger port for securing the display screen module 18 that may be larger than other modules. It should be appreciated that the electronic device 10 may include fewer or more layers.

Figure 3A:
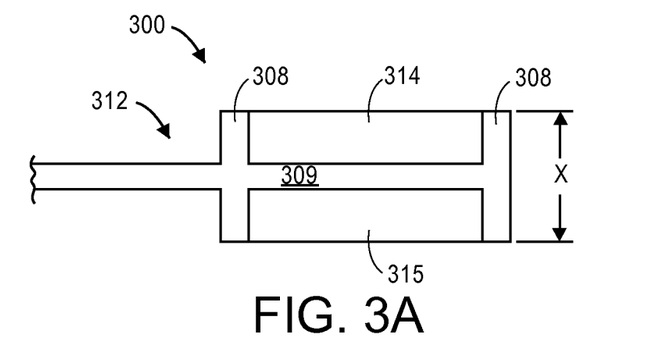
FIGS. 3A and 3B depict cross-section views of example electronic devices and corresponding support housings, in accordance with some embodiments.

FIG. 3A is a cross-section view of a conventional electronic device 300 that supports a set of modules. The electronic device 300 may include a support housing 312 that may be defined by a set of ribs 308 (and/or a set of spines (not shown in FIG. 3A)) as well as a center plate 309, which is depicted as the horizontal component of the support housing 312 in FIG. 3A. Generally, an overall thickness or height "x" of the electronic device 300 is defined by a thickness of the center plate 309, a thickness of a front module 314, and a thickness of a rear or back module 315. As discussed herein, each of the front module 314 and the rear module 315 may removably secure to respective slots of the support housing 312, and specifically to respective slots of a front surface and a rear surface of the center plate 309 of the support housing 312.

Although the modules as described herein are referenced by the terms "front" and "rear," it should be appreciated that the modules are not limited to secure to a particular "front" or "rear" side of the corresponding electronic device. Accordingly, any "front" module may secure to a "rear" side of the electronic device, and any "rear" module may secure to a "front" side of the electronic device. Indeed, the "front" modules as well as a "front" side of the electronic device, and the "rear" modules as well as a "rear" side of the electronic device may be understood to not have a relative direction or side, and may generally be thought of as a "first" module and "first" side, and "second" module and "second" side.

In one implementation, each of the center plate 309, the front module 314, and the rear module 315 may have approximately the same thickness (e.g., 4 mm, resulting in a total thickness "x" of 12 mm). However, it should be appreciated that the respective thicknesses may vary. Because of the presence of the support housing 312 to which the front module 314 and the rear module 315 are secured, each of the front module 314 and the rear module 315 are constrained to their respective thicknesses (e.g., 4 mm each). As a result, each of the front module 314 and the rear module 315 must entirely contain its respective components that correspond to the function, application, or operation of the electronic device 300.

Figure 3B:
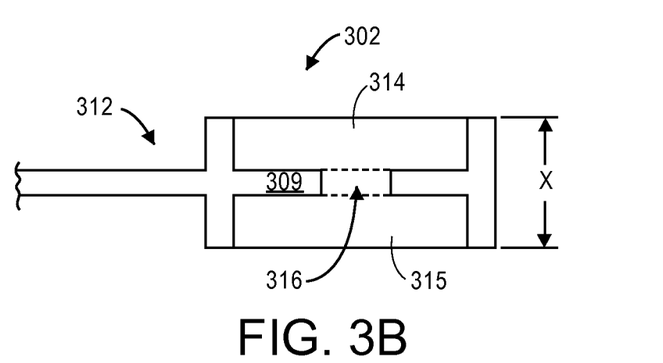

FIG. 3B is a cross-section view of an electronic device 302 according to the present embodiments. Similar to the electronic device 300 illustrated in FIG. 3A, the electronic device 302 may include the support housing 312 with the center plate 309, the front module 314, and the rear module 315. Additionally, the center plate 309 of the support housing 312 may include an opening 316 extending therethrough from a corresponding front slot to a corresponding rear slot. Accordingly, the opening 316 may enable the front module 314 to physically interface with the rear module 315, as the center plate 309 of the support housing 312 no longer entirely separates the front module 314 from the rear module 315.

Therefore, as a result of the opening 316, each of the front module 314 and the rear module 315 may not be constrained to the thickness of its corresponding slot. Instead, each of the front module 314 and the rear module 315, and components thereof, may utilize or employ the opening 316 and/or the space or thickness of the respective other module 315, 314. In embodiments, the opening 316 and/or the space or thickness of the respective other module 315, 314 may accommodate any hardware components that are included in the modules 314, 315. Further, the opening 316 and/or the space or thickness of the respective other module 315, 314 may enable improved performance of one or both of the modules 314, 315. This may be particularly realized if the modules 314, 315 are "paired" modules where each contains a component(s) that facilitates operation of a particular function, application, or operation of the electronic device 302. As a result, each of the front module 314 and the rear module 315 need not entirely contain its respective components that correspond to the function, application, or operation of the electronic device 302.

In some implementations, the front module 314 and/or the rear module 315 may include an additional component(s) that may be associated with an additional functionality of the electronic device 302. For example, the front module 314 may include both an imaging sensor associated with an image capture application and a display screen configured to display content.

Figure 4A:
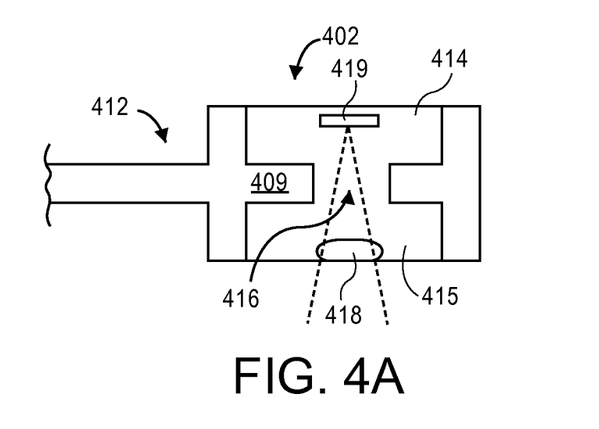
FIGS. 4A and 4B depict side views of an example electronic with different hardware modules secured thereto, in accordance with some embodiments.

FIG. 4A depicts an electronic device 402 that may support an imaging module and associated components and functions. Similar to the electronic device 302 illustrated in FIG. 3B, the electronic device 402 may include a support housing 412 and a center plate 409 with an opening 416 extending therethrough, a front module 414, and a rear module 415. The front module 414 may include an image sensor 419 and the rear module 415 may include a lens 418. Generally, the image sensor 419 may be configured to record image data according to light that passes through the lens 418, thus resulting in digital images.

Although FIG. 4A depicts the single lens 418, it should be appreciated that the lens 418 may include multiple fixed or movable lens elements, such as if the lens 418 is a zoom lens and/or an autofocus lens. Further, it should be appreciated that the lens 418 may be of or include various sizes, types, apertures, and/or other properties. Similarly, the image sensor 419 may be any type of image sensor, including CCD, CMOS, sCMOS, BSI-CMOS, or the like, having various properties. In particular, the image sensor 419 may support various aspect ratios, resolutions, sensitivities, field of view crop factors, depths of field, dynamic ranges, active areas, shading effects, color schemes (e.g., full color resolution or monochrome), and/or other technical specifications.

As illustrated in FIG. 4A, the opening 416 may define an optical path that may enable captured light to pass from the lens 418 to the image sensor 419. Because the image sensor 419 is contained in the front module 414 and the lens 418 is contained in the rear module 415, the image sensor 419 and the lens 418 may be afforded more space (in particular, the thicknesses of the front module 415, rear module 415, and the center plate 409) to facilitate the imaging functionalities. In particular, the image sensor 419 may be larger than an image sensor constrained to the thickness of a single module. Further, the focal length of the lens 418 may be greater than that afforded by a lens also constrained to the thickness of a single module.

As a further benefit, a user of the electronic device 402 may replace the rear module 415 containing the lens 418 with any additional module(s) that contains a different type or size of lens(es). For example, the user may replace a module having a lens with a 50 mm focal length with another module having a lens with an adjustable focal length of 10-20 mm. Further, the user of the electronic device may replace the front module 414 containing the image sensor 419 with any additional module(s) that contains a different image sensor(s). For example, the user may replace a module having an image sensor with a 4208×3120 pixel resolution (e.g., for high resolution photography) with another module having an image sensor with a 1920×1080 pixel resolution (e.g., for full HD video).

Although not shown in FIG. 4A, the opening 416 may be configured to house or secure additional components or elements associated with the imaging module. For example, the opening 416 may house or secure a filter, an adjustable aperture, additional lens elements, and/or other components. Further, although FIG. 4A illustrates the image sensor 419 as contained in the front module 414 and the lens 418 as contained in the rear module 415, it should be appreciated that the image sensor 419 and/or the lens 418, or a portion thereof, may extend into and/or be disposed within the opening 416. In one implementation, at least a portion of the image sensor 419 and/or the lens 418 (or another component(s)) may extend into the opening 416 upon the respective front module 414 and/or rear module 415 securing to the support housing 412. In this implementation, a processor of the electronic device 402 may detect when the front module 414 and/or the rear module 415 connects to the support housing 412, and may accordingly cause the image sensor 419 and/or the lens 418 (or another component(s)) to extend into the opening 416.

Figure 4B:
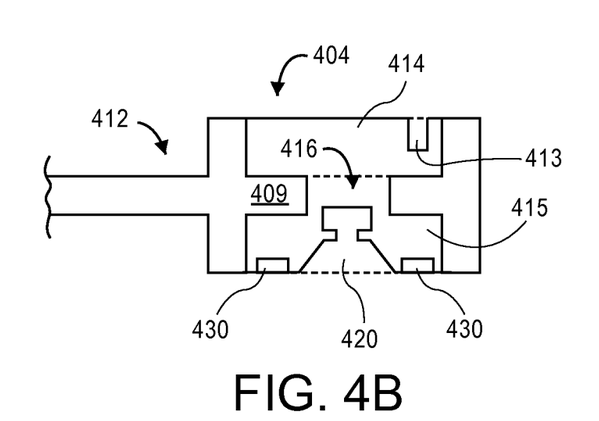

FIG. 4B depicts an electronic device 404 that may support an audio module and associated components and functions. Similar to the electronic device 402 illustrated in FIG. 4A, the electronic device 404 may include the support housing 412 and a center plate 409 with the opening 416 extending therethrough, the front module 414, and the rear module 415. The rear module 415 may include a speaker or transducer 420 that is configured to output audio according to an applied electrical signal. Further, the front module 414 may be in the form of a cavity that serves as a "back volume" for the speaker 420. In operation, the speaker 420 may push against the back volume contained within the front module 414 to cause the speaker 420 to project audio. Generally, a larger back volume for the speaker 420 may result in many improvements and benefits, including more effective vibration and heat management, improved sound frequencies, greater sound volume, and others.

As illustrated in FIG. 4B, the opening 416 may enable the speaker 420 to be acoustically exposed to the back volume of the front module 414, thus enabling the speaker 420 to realize the benefits of a larger back volume. Because the speaker 420 is contained in the rear module 415 and the back volume is contained in the front module 414 opposite the rear module 415, the speaker 420 and the back volume are afforded more space (namely, the thicknesses of the front module 415, rear module 415, and the center plate 409) to facilitate the audio functionalities. In particular, each of the speaker 420 and the back volume may be larger than a speaker and a back volume that are constrained to the thickness of a single module.

As depicted in FIG. 4B, the front module 414 may also include a port or vent 413 which may further improve or modify the audio output. Additionally, either or both of the front module 414 and the rear module 415 may include (or the opening 416 may contain) a driver that is designed for a specific frequency range. For example, as depicted in FIG. 4B, an exterior side of the rear module 415 may include a pair of "tweeters" 430 that are designed to output high frequency sound. It should be appreciated that additional benefits may be realized.

Although not shown in FIG. 4B, the opening 416 may be configured to house or secure additional components or elements associated with the audio module. For example, the opening 416 may house or secure one or more terminals, coils, wires, and/or the other components. Additionally or alternatively, the front module 414 may house or secure one or more terminals, coils, wires, and/or other components while still adding a back volume to supplement operation of the speaker 420. Further, although FIG. 4B illustrates the speaker 420 as contained in the rear module 415, it should be appreciated that the speaker 420, or a portion thereof, may extend into and/or be disposed within the opening 416. In one implementation, at least a portion of the speaker 420 (or another component(s)) may extend into the opening 416 upon the rear module 415 securing to the support housing 412. In this implementation, a processor of the electronic device 404 may detect when the rear module 415 connects to the support housing 412, and may accordingly cause the speaker 420 (or another component(s)) to extend into the opening 416.

Figure 5A:
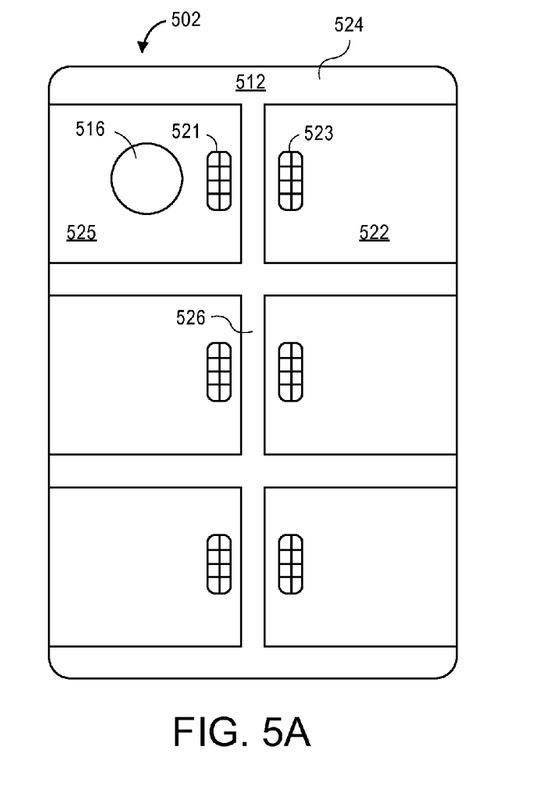
FIGS. 5A and 5B depict different views of an example electronic device and corresponding support housing with an opening integrated therein, in accordance with some embodiments.

Referring to FIG. 5A, depicted is a front view of an example modular electronic device 502 without any modules secured thereto. Accordingly, FIG. 5A depicts support components of the electronic device 502, namely a support housing 512 defining a set of slots to which modules may removably secure via a set of associated connector components. The set of slots may be defined by a set of one or more horizontal "endoribs" 524, a set of one or more vertical "endospines" 526, and a center plate. For example, the support housing 512 may include a first front slot 525 having a first front connector component 521 and a second front slot 522 having a second front connector component 523.

The first front slot 525 may include an opening 516 extending through the center plate of the support housing 512 to a corresponding rear slot of the support housing 512. The opening 516 as depicted in FIG. 5A may be in the form of a hole that may be entirely surrounded by the center plate, and may take one of many shapes including a circle, square, rectangle, triangle, or any other symmetric or asymmetric shape.

Figure 5B:
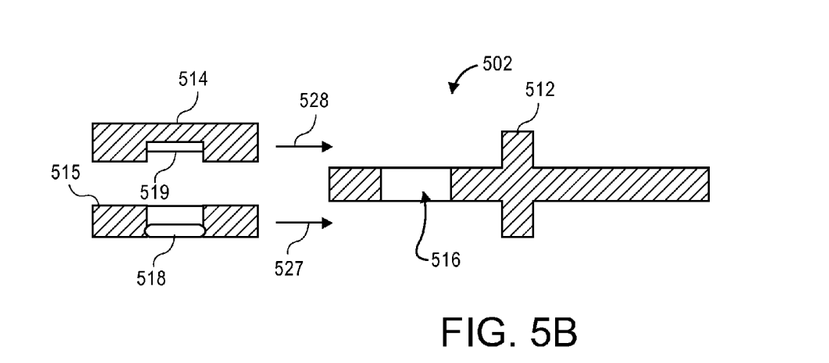

A cross-section view of the electronic device 502 is shown in FIG. 5B. The cross-section view depicts the support housing 512 and the opening 516 extending through the center plate, where the opening 516 is located in the first front slot 525 as illustrated in FIG. 5A. As depicted in FIG. 5B, a front module 514 may include an image sensor 519 and may removably secure to the first front slot 525 as shown by arrow 528. Similarly, a rear module 515 may include a lens 518 and may removably secure to the corresponding rear slot as shown by arrow 527. Accordingly, when the front module 514 and the rear module 515 are secured to the housing 512, the opening 516 may define an optical path the enables captured light to pass from the lens 518 to the image sensor 519. It should be appreciated that modules that support components or functionalities other than an imaging module are envisioned.

Figure 6A:
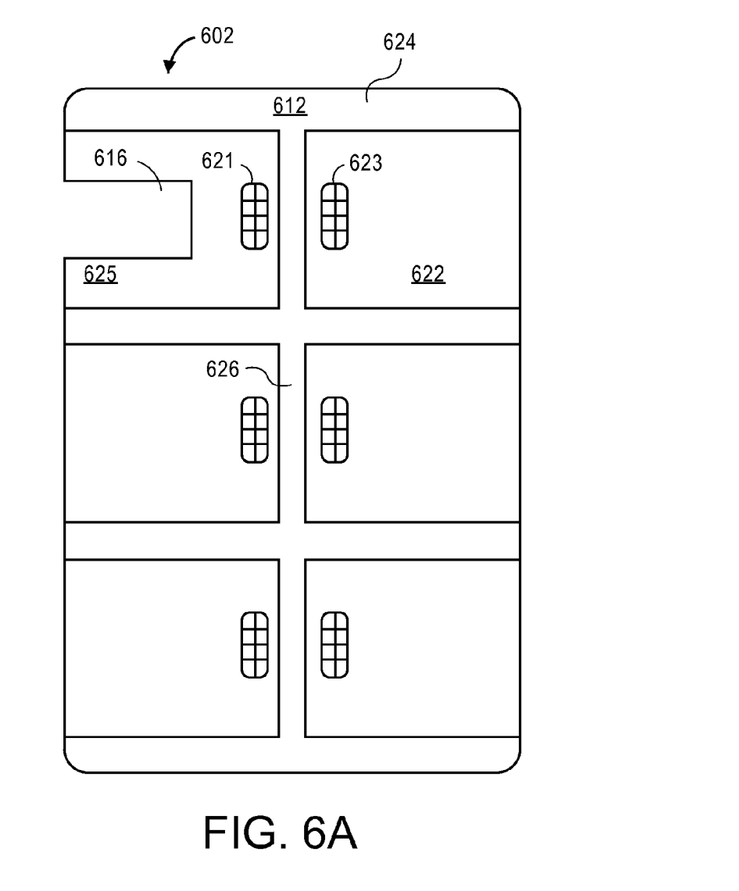
FIGS. 6A and 6B depict different views of an example electronic device and corresponding support housing with a slot opening integrated therein, in accordance with some embodiments.

Referring to FIG. 6A, depicted is a front view of another example modular electronic device 602 without any modules secured thereto. Accordingly, FIG. 6A depicts support components of the electronic device 602, namely a support housing 612 defining a set of slots to which modules may removably secure via a set of associated connector components. The set of slots may be defined by a set of one or more horizontal "endoribs" 624, a set of one or more vertical "endospines" 626, and a center plate. For example, the support housing 612 may include a first front slot 625 having a first front connector component 621 and a second front slot 622 having a second front connector component 623.

The first front slot 625 may include an opening 616 extending through the center plate of the support housing 612 to a corresponding rear slot of the support housing 612. The opening 616 as depicted in FIG. 6A may be in the form of a slot that is partially surrounded by the center plate, where the slot may take one of many shapes including a semicircle, square, rectangle, triangle, or any other symmetric or asymmetric shape.

Figure 6B:
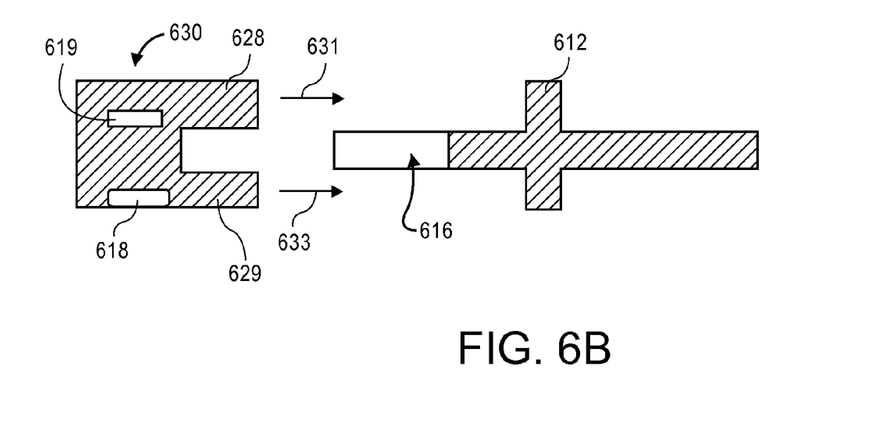

A cross-section view of the electronic device 602 is shown in FIG. 6B. The cross-section view depicts the support housing 612 and the opening 616 extending through the center plate, where the opening 616 is located in the first front slot 625 as illustrated in FIG. 6A. Due to the configuration of the opening 616, a module 627 may integrate both a front portion 628 and a rear portion 629, as shown in FIG. 6B. Further, as shown by arrows 631, 633, the front portion 628 may removably secure to the first front slot 625 and the rear portion 629 may removably secure to the corresponding rear slot.

The module 627, therefore, may include both an image sensor 619 contained in the front portion 628 and an lens 618 contained in the rear portion 629, where the module 627 may have a thickness defined by the combined thickness of the front portion 628, the center plate, and the rear portion 629. Accordingly, when the module 627 is secured to the housing 612, the opening 616 may define an optical path the enables captured light to pass from the lens 618 to the image sensor 619. It should be appreciated that modules that support components or functionalities other than an imaging module are envisioned.

Although FIGS. 5A, 5B, 6A, and 6B depict modules that utilize the respective openings 516, 616, it should be appreciated that the respective openings 516, 616 do not preclude a user from securing modules that do not use the respective openings 516, 616 to the respective front and rear slots. Further, although the respective electronic devices 502, 602 depicted in FIGS. 5A, 5B, 6A, and 6B include the single opening 516, 616, it should be appreciated that the respective electronic device 502, 602 may include multiple openings, including an implementation in which all of the slots include an opening. For example, the electronic device 502 may include one opening that may be utilized by a set of speaker modules and another opening that may be utilized by a set of imaging modules. Moreover, although the embodiments primarily describe two types of modules that may utilize the openings 516, 616, namely imaging modules and audio modules, it should be appreciated that the electronic devices 502, 602 and the openings 516, 616 thereof support any type of module which may utilize the free-space connection between device sides that is created by the openings 516, 616.

Figure 7A:
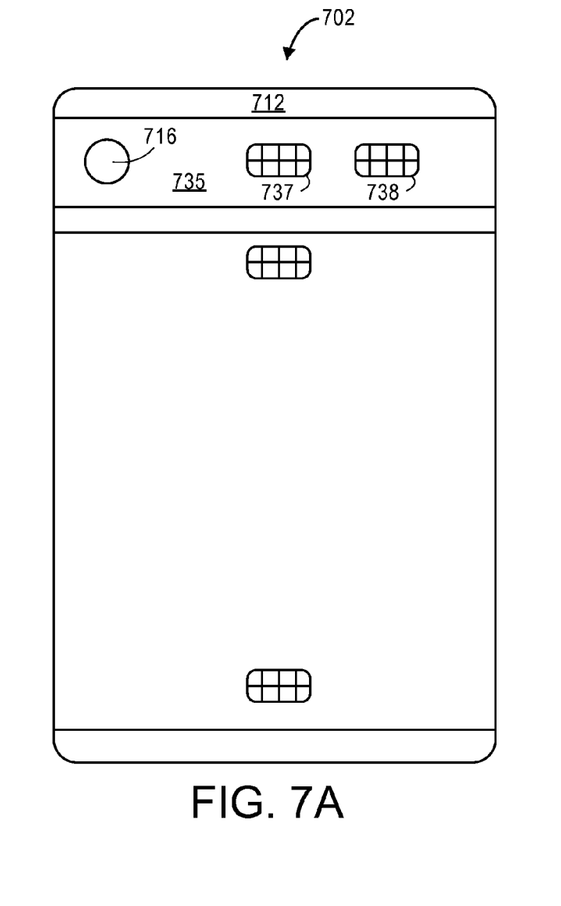
FIGS. 7A and 7B depict different views of an example electronic device and corresponding support housing with an opening integrated therein, in accordance with some embodiments.

Referring to FIG. 7A, depicted is a front view of another example modular electronic device 702 without any modules secured thereto. Accordingly, FIG. 7A depicts support components of the electronic device 702, namely a support housing 712 and center plate defining a set of slots to which modules may removably secure via a set of associated connector components. As shown in FIG. 7A, the support housing 712 may include a front slot 735 having a first connector component 737 and a second connector component 738 to which a module may removably secure.

The front slot 735 may include an opening 716 that may extend through the center plate of the support housing 712 to a corresponding rear slot of the support housing 712. The opening 716 as depicted in FIG. 7A may be completely surrounded by the center plate, and may take one of many shapes including a circle, square, rectangle, triangle, or any other symmetric or asymmetric shape. In some implementations, the opening 716 may be a slot that may be partially surrounded by the center plate.

Figure 7B:
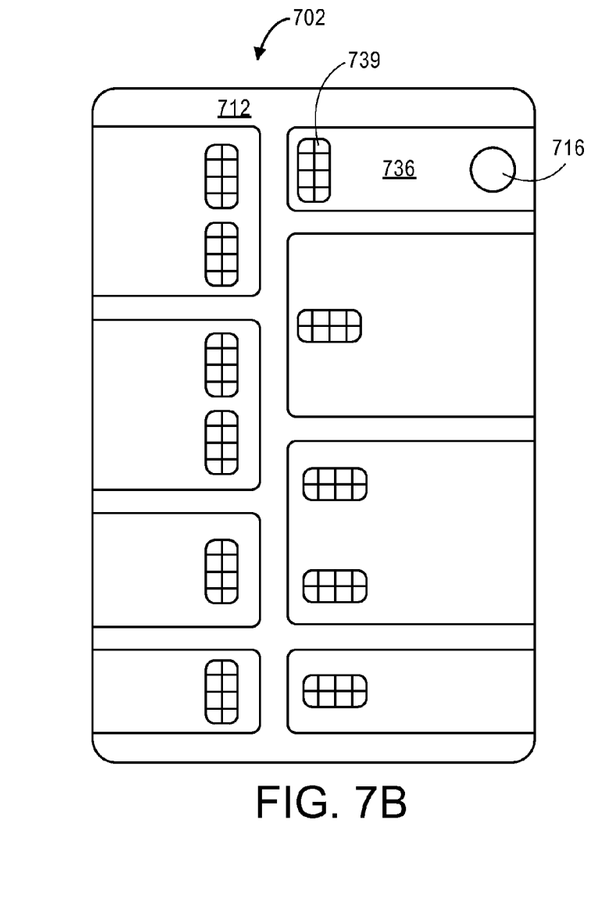

FIG. 7B depicts is a rear view of the electronic device 702. Similar to the front view, the rear view depicts support components of the electronic device 702, namely the support housing 712 and center plate defining a set of slots to which modules may removably secure via a set of associated connector components. As shown in FIG. 7B, the support housing 712 may include a rear slot 736 having a connector component 739 to which a module may removably secure.

The rear slot 736 may include the opening 716 that extends through the center plate of the support housing 712 from the front slot 735. Accordingly, FIG. 7B depicts the electronic device 702 and the opening 716 as if the electronic device is flipped over from the front view as depicted in FIG. 7A. As further depicted in FIGS. 7A and 7B, the front slot 735 is a different size than the rear slot 736, and also includes a different amount (2) of connector components 737, 738 than the single connector component 739 of the rear slot 736. Accordingly, any front module that secures to the front slot 735 may have a different size or configuration than any rear module that secures to the rear slot 736, while the opening 716 may enable the front module to physically interface with the rear module. Accordingly, the electronic device 702 may enable a plurality of configurations of front and rear modules having a plurality of associated components and functions.

Figure 8:
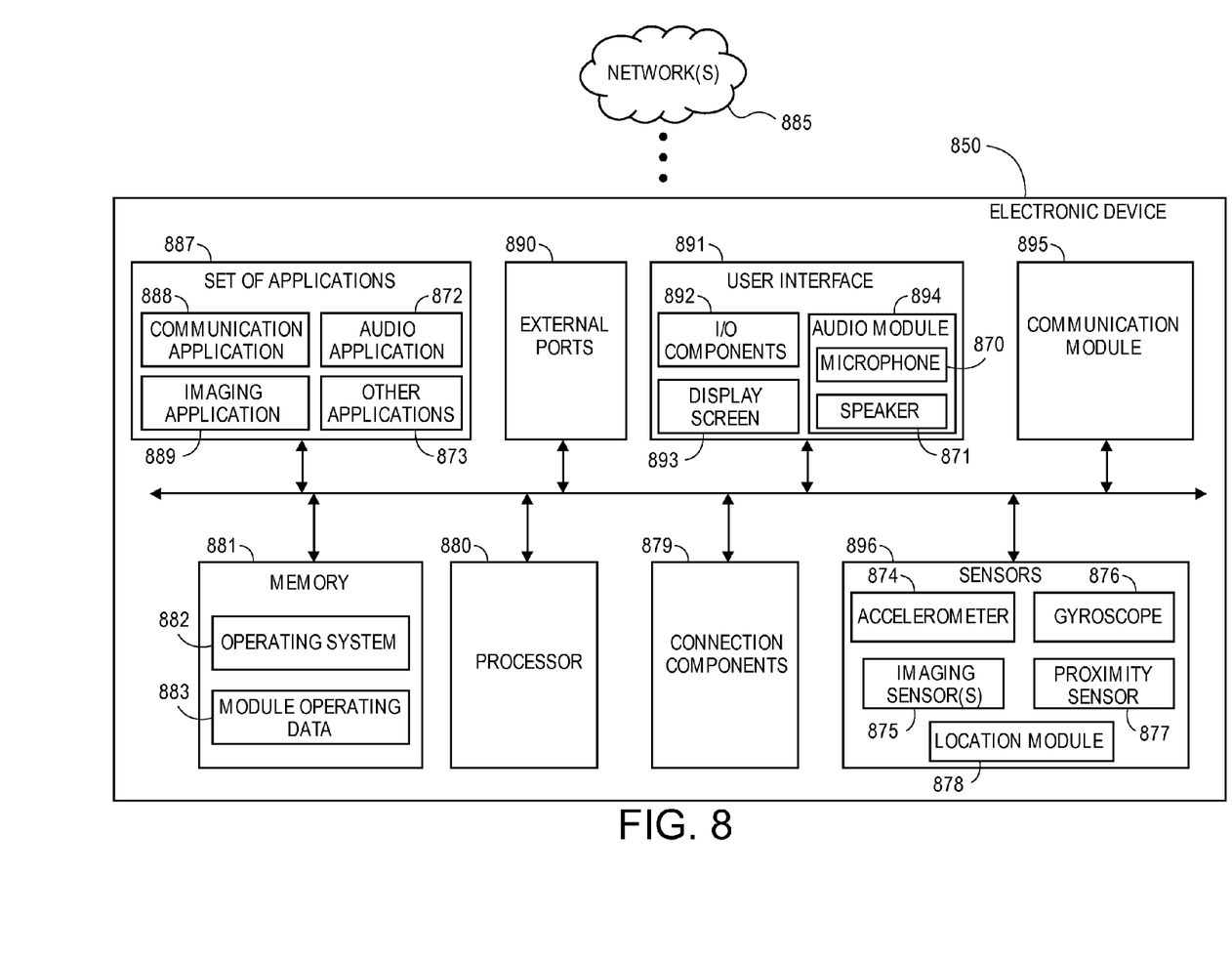
FIG. 8 is a block diagram of an electronic device in accordance with some embodiments.

FIG. 8 illustrates an example electronic device 850 (such as the electronic device 10 discussed with respect to FIG. 2A, or other devices) in which the functionalities as discussed may be implemented. The electronic device 850 may include a processor 880 or other similar type of controller module or microcontroller, as well as a memory 881. The processor 880 may include a singular processor or may include more than one separate processor such as: an application processor to manage a set of applications 887 and a user interface 891 of the electronic device 850, a sensor processor to manage sensor 896 data, and an audio processor to process audio 894 data.

The memory 881 may store an operating system 882 capable of facilitating the functionalities discussed. The processor 880 may interface with the memory 881 to execute the operating system 882 and the set of applications 887. The set of applications 887 (which the memory 881 may also store) may include a communications application 888 configured to facilitate various communications, an imaging application 889 configured to capture digital image and video data, and an audio application 872 configured to manage audio playback. The set of applications 887 may also include one or more other applications 873 such as, for example, music and entertainment applications, phone applications, messaging applications, calendar applications, social networking applications, utilities, productivity applications, games, travel applications, communication application, shopping applications, finance applications, sports applications, photography applications, mapping applications, weather applications, applications for connecting to an online marketplace, and/or other applications.

The memory 881 may further store module operating data 883 that indicates various information associated with modules and functions/applications corresponding thereto. Generally, the memory 881 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 850 may further include a communication module 895 configured to interface with one or more external ports 890 to communicate data via one or more wired or wireless networks 885. For example, the communication module 895 may leverage the external ports 890 to establish a wide area network for connecting the electronic device 850 to other components such as a remote data server. According to some embodiments, the communication module 895 may include one or more transceivers functioning in accordance with IEEE standards, 3GPP standards, or other standards, and configured to receive and transmit data via the one or more external ports 890. More particularly, the communication module 895 may include one or more WWAN, WLAN, and/or WPAN transceivers configured to connect the electronic device 850 to wide area networks, local area networks, and/or personal area networks.

The electronic device 850 may further include one or more sensors 896 such as one or more accelerometers 874, gyroscopes 876, imaging sensors 875, proximity sensors 877, and one or more location modules 878. The sensors 896 may also include other types of sensors such as light sensors, infrared sensors, touch sensors, NFC components, and other sensors. The electronic device 850 may further include a user interface 891 configured to present information to the user and/or receive inputs from the user. As illustrated in FIG. 8, the user interface 891 may include a display screen 893 and I/O components 892 (e.g., capacitive or resistive touch sensitive input panels, keys, buttons, lights, LEDs, cursor control devices, haptic devices, and others). In embodiments, the display screen 893 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 891 may further include an audio module 894 including hardware components such as one or more speakers 871 for outputting audio data and one or more microphones 870 for detecting or receiving audio.

According to embodiments, the components of the user interface 891 may be embodied in hardware modules that may connect to the electronic device 850. For example, the imaging sensor(s) 875 may be part of an imaging module that connects to the electronic device 850. Similarly, the hardware modules may include one or more of the set of sensors 896, as well as hardware that contributes to operation of the processor 880, to capacity or operation of the memory 881, or to functionality of the communication module 895 and/or the external ports 890. The hardware modules may connect to the electronic device 850 via a set of connection components 879 that may be part of a support housing of the electronic device 850.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 880 (e.g., working in connection with the operating system 882) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. An electronic device comprising:
    a support housing comprising:
        a front surface defined by a set of front slots,
        a rear surface defined by a set of rear slots, and
        a center plate having (i) an opening extending therethrough from a front slot of the set of front slots to a rear slot of the set of rear slots, and (ii) an additional opening extending therethrough from an additional front slot of the set of front slots to an additional rear slot of the set of rear slots;
    a front connector component integrated into the front slot;
    a rear connector component integrated into the rear slot;
    a front hardware module configured to removably secure to the front slot via the front connector component; and
    a rear hardware module configured to removably secure to the rear slot via the rear connector component;
    wherein the opening in the center plate enables the front hardware module to physically interface with the rear hardware module.

2. The electronic device of claim 1, wherein the front hardware module comprises an image sensor and the rear hardware module comprises an optical lens, and wherein the opening defines an optical path that enables captured light to pass from the optical lens to the image sensor.

3. The electronic device of claim 2, further comprising:
    an optical element disposed within the opening and defining part of the optical path between the optical lens and the image sensor.

4. The electronic device of claim 1, wherein the front hardware module comprises a speaker configured to output audio and the rear hardware module comprises a cavity that is acoustically exposed to the speaker via the opening.

5. The electronic device of claim 1, wherein a portion of at least one of the front hardware module and the rear hardware module extends into the opening.

6. The electronic device of claim 1, wherein at least one of the front hardware module and the rear hardware module is replaceable with an additional hardware module.

7. The electronic device of claim 1, wherein the opening is one of:
    a hole that is entirely surrounded by the center plate, or
    a slot that is partially surrounded by the center plate.

8. The electronic device of claim 7, wherein when the opening is the slot, the front hardware module and the rear hardware module are integrated into a single hardware module.

9. The electronic device of claim 1, further comprising:
    a memory storing a set of computer-executable instructions; and
    a processor interfacing with the memory, and configured to execute the set of computer-executable instructions to cause the processor to:
        identify a function associated with both the front hardware module and the rear hardware module, and
        activate the function.

10. A device configured for digital image capture, comprising:
    a support housing comprising:
        a first surface defined by a first set of slots,
        a second surface defined by a second set of slots, and
        a center plate having an opening extending therethrough from a first slot of the first set of slots to a second slot of the second set of slots,
    a first connector component integrated into the first slot;
    a second connector component integrated into the second slot;
    a first hardware module configured to removably secure to the first slot via the first connector component, the first hardware module comprising an image sensor; and
    a second hardware module configured to removably secure to the second slot via the second connector component, the second hardware module comprising an optical lens;
    wherein the opening in the center plate defines an optical path that enables captured light to pass from the optical lens to the image sensor;
    and wherein when the second hardware module is activated, the optical lens (i) does not protrude from the second hardware module and (ii) extends into the opening.

11. The device of claim 10, wherein the first slot differs from the second slot in at least one of size and shape.

12. The device of claim 10, further comprising:
    a memory; and
    a processor interfacing with the memory and configured to:
        execute an image capture application that enables capture of a set of digital images using the optical lens and the image sensor, and
        store the set of digital images in the memory.

13. The device of claim 10, further comprising:
    an optical element disposed within the opening and defining part of the optical path between the optical lens and the image sensor.

14. The device of claim 10, wherein a portion of at least one of the first hardware module and the second hardware module extends into the opening.

15. The device of claim 10, wherein the first hardware module further comprises an additional component associated with a functionality of the device.

16. An electronic device comprising:
    a support housing defining:

a set of front slots,
a set of rear slots, and
a center plate having (i) an opening extending therethrough from a front slot of the set of front slots to a rear slot of the set of rear slots, and (ii) an additional opening extending therethrough from an additional front slot of the set of front slots to an additional rear slot of the set of rear slots;

a front connector component integrated into the front slot; and a rear connector component integrated into the rear slot; wherein:

(i) the front slot is configured to removably secure a front hardware module via the front connector component,    (ii) the rear slot is configured to removably secure a rear hardware module via the rear connector component, and    (iii) the opening in the center plate enables the front hardware module to physically interface with the rear hardware module.

17. The electronic device of claim 16, wherein the front slot removably secures the front hardware module comprising an image sensor and the rear slot removably secures the rear hardware module comprising an optical lens, and wherein the opening defines an optical path that enables captured light to pass from the optical lens to the image sensor.

18. The electronic device of claim 16, wherein the front slot removably secures the front hardware module comprising a speaker configured to output audio and the rear slot removably secures the rear hardware module comprising a cavity that is acoustically exposed to the speaker via the opening.

* * * * *

UNITED STATES PATENT AND TRADEMARK OFFICE
CERTIFICATE OF CORRECTION

PATENT NO. : 9,560,178 B1  
APPLICATION NO. : 14/724265  
DATED : January 31, 2017  
INVENTOR(S) : Philip Sean Stetson et al.

Page 1 of 1

It is certified that error appears in the above-identified patent and that said Letters Patent is hereby corrected as shown below:

In the Claims

At Column 13, Line 33, "device" should be -- device, --.

At Column 14, Line 28, "slots," should be -- slots; --.

At Column 14, Line 66, "device" should be -- device, --.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*